G. L. LAUGHLAND.
Wire-Ties for Baling Hay, &c.
No. 141,879. Patented August 19, 1873.
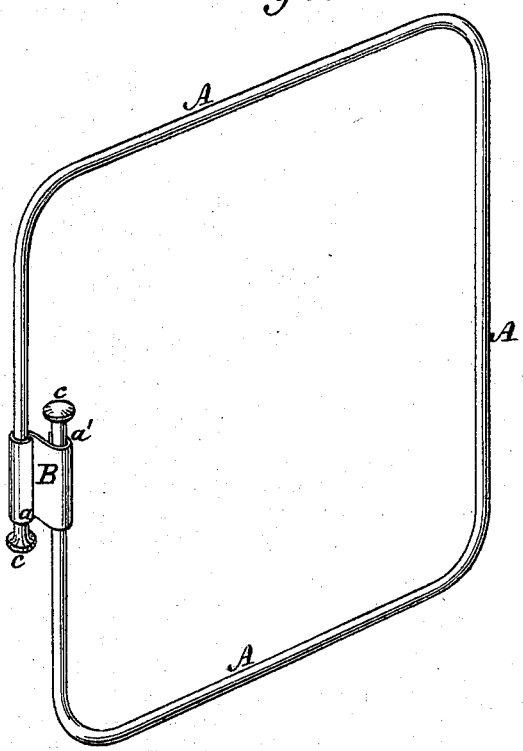
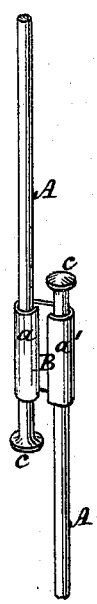

UNITED STATES PATENT OFFICE.

GEORGE L. LAUGHLAND, OF NEW YORK, N. Y.

IMPROVEMENT IN WIRE TIES FOR BALING HAY, &c.

Specification forming part of Letters Patent No. 141,879, dated August 19, 1873; application filed August 2, 1873.

*To all whom it may concern:*

Be it known that I, GEORGE L. LAUGHLAND, of the city, county, and State of New York, have invented certain new and useful Improvements in Wire Ties for Baling Hay and similar articles; and I do hereby declare the following to be a full, clear, and exact description of the same, reference being had to the accompanying drawings making a part of this specification, in which—

Figure 1 represents, in perspective, one of the wire ties complete, and as it appears when around the bale. Fig. 2 represents an obvious modification of the shape or form of the hook or socket, or whatever it may be termed, for receiving and holding the ends of the wire.

Hay, to admit of or justify transportation for considerable distances, must be baled in some way cheaper than that used in baling the more valuable product of cotton, as the cost of transportation is about equal, while the market value of hay is only about one-tenth, or less, of that of cotton. Annealed wire has been used for baling hay; but such wire is expensive, as it must be annealed, in order that it may be looped, twisted, or otherwise bent, to fasten the ends around the bale; and being annealed so as to bend, much of its strength is expended, and a larger gage of wire must be used to obtain the necessary strength to hold the hay, which is now baled in very heavy presses, and into a very solid and compact bale, to cheapen transportation, and admit of its being carried greater distances than heretofore.

The object and purpose of my invention are to provide a wire tie for baling hay, that will be strong enough to hold a marketable bale, and cheap enough to admit of general use by farmers. My invention consists of a wire tie composed of bright or unannealed wire, as being much stronger than annealed wire of the same gage, and a hook or socket to receive and hold the upset or enlarged ends of the wire after it has been passed around the bale, and the bale released from the press.

To enable others skilled in the art to make and use my invention, I will proceed to describe the same with reference to the drawings.

The band A is made of bright or unannealed wire, because much stronger than annealed wire of the same gage. The hook, socket, or holder B may be of wrought or plate metal, of suitable strength, and bent or struck up so as to have two sockets, ferrules, or sleeves, $a$ $a'$, for receiving and holding the ends of the wire bands. The ends of the wire bands, as at $c$ $c$, are, before or after they have been passed into or through the sockets or holders $a$ $a'$, upset or enlarged by a hammer or die, to prevent them from being drawn out by the expansive force of the bale after it has been removed from the press. The upsetting or enlarging of the ends of the wire to prevent them from drawing out of the holders may be very quickly and cheaply done by griping the end of the wire in a vise or clamp, and then, by a blow of a hammer or drop-die, the riveting or upsetting is done. By this mode of fastening the ends of the wire to their holders, it will be seen that there is no waste of the wire by twisting, bending, or looping the ends, as heretofore practiced; so that in every essential of cheapness, strength, and ready application of the tie, it comes within the wants and demands of the user.

These wire bands are manufactured and put into the market in a finished state—that is, of such suitable lengths as will go around the bales to be put up—and with the ends enlarged, as shown. One of the sockets, as at $a$, may be a close or closed one, and slipped onto the wire before one or both of its ends are upset or enlarged; and the other socket or holder, as at $a'$, is left sufficiently open so that the wire may be laid into it sidewise, with the head of the wire projecting therefrom. When the strain comes on, these enlarged ends are drawn up tight against the holder.

While I have limited myself to unannealed wire for tie-bands, I would state that a partially or fully annealed wire might be used to evade my invention; I therefore state that I would regard any wire band, with its ends enlarged, as shown and described, as falling within the scope of my invention; and instead of one only, both sockets may be open to receive the wire sidewise.

Having thus fully described my invention, what I claim therein as new, and desire to secure by Letters Patent, is—

1. A wire tie for baling hay and similar substance, composed of a bright or unannealed wire band, the ends of which are upset, riveted, or enlarged at opposite ends of a holder, constructed and operating substantially as herein described, and for the purpose set forth.

2. As a new article of manufacture, for baling hay, wires or wire rods cut into suitable lengths, and their ends upset or enlarged, and ready to be united to holders without twisting, as described and represented.

GEORGE L. LAUGHLAND.

Witnesses:
GEO. W. WISE,
CHARLES BARBOT.